(No Model.) 2 Sheets—Sheet 1.
J. T. & J. A. DRUMMOND.
PLOW.
No. 517,333. Patented Mar. 27, 1894.
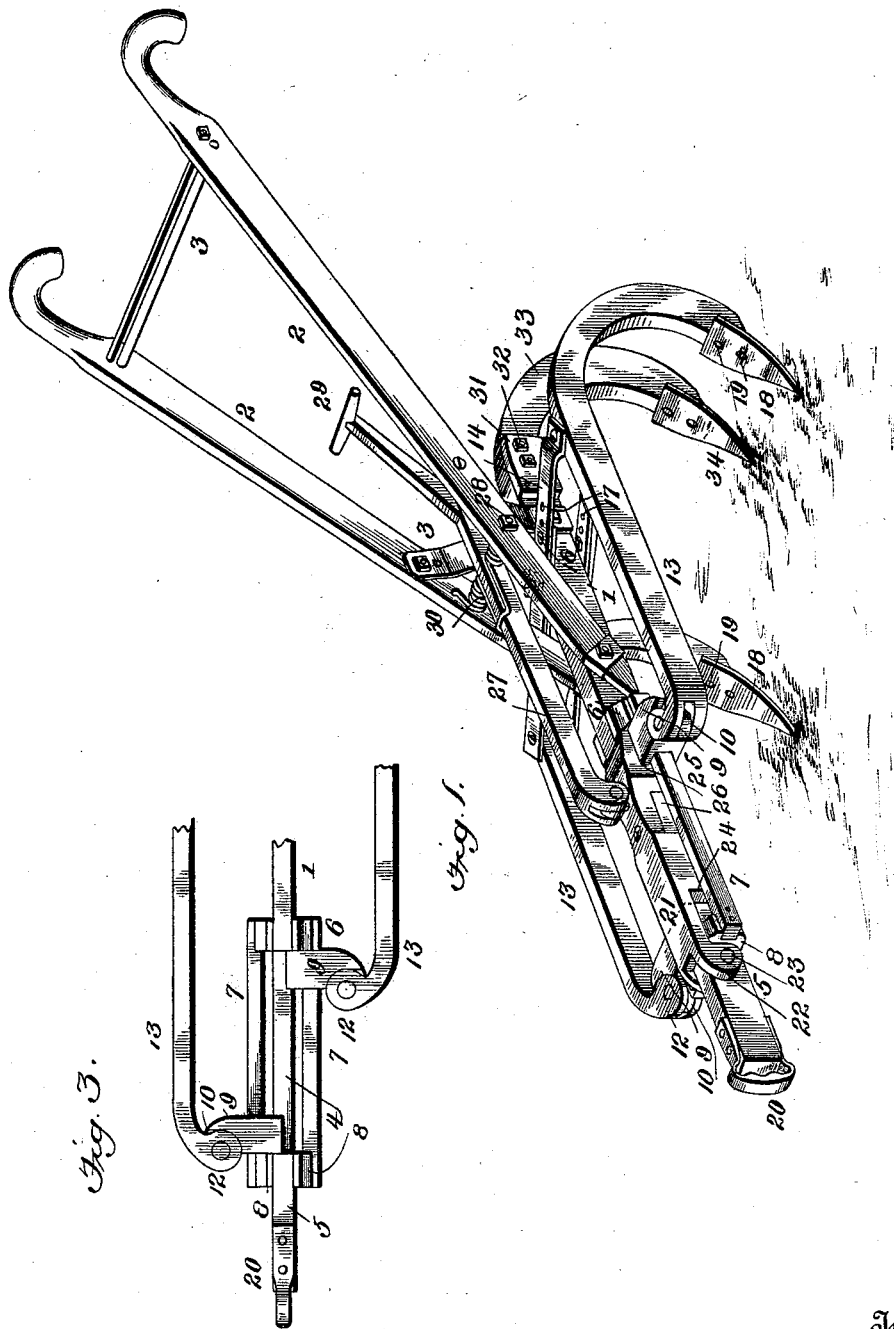
Witnesses
J. Ku Lainie
G. W. Rea.
Inventors
John T. Drummond and
James A. Drummond
By James L. Norris.
their Attorney

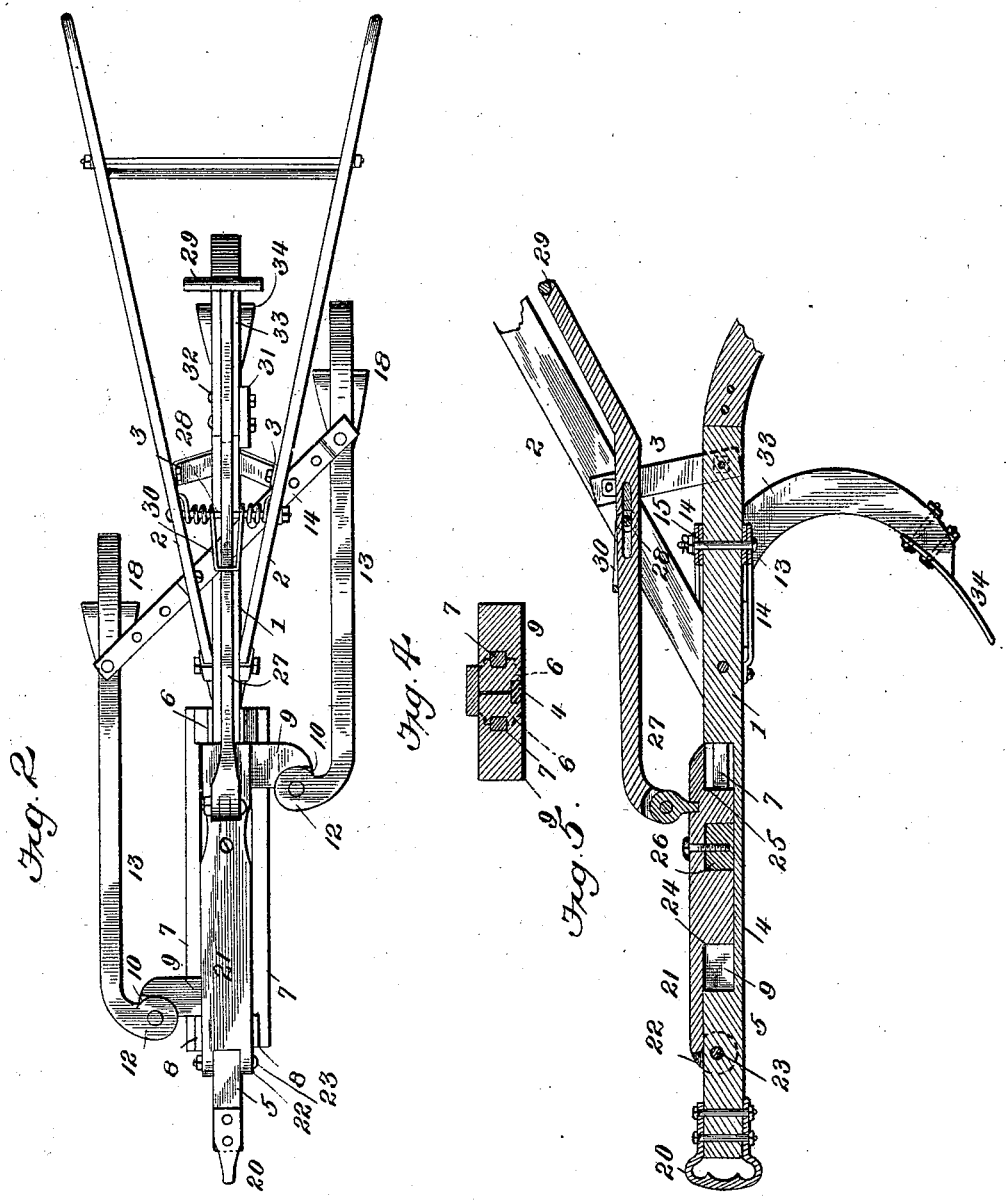

UNITED STATES PATENT OFFICE.

JOHN THOMAS DRUMMOND AND JAMES ALEXANDER DRUMMOND, OF GREENVILLE, TENNESSEE.

PLOW.

SPECIFICATION forming part of Letters Patent No. 517,333, dated March 27, 1894.

Application filed November 18, 1893. Serial No. 491,349. (No model.)

*To all whom it may concern:*

Be it known that we, JOHN THOMAS DRUMMOND and JAMES ALEXANDER DRUMMOND, citizens of the United States, residing at Greenville, in the county of Greene and State of Tennessee, have invented new and useful Improvements in Plows, of which the following is a specification.

It is the purpose of our invention to provide a plow having certain novel features of construction and new combinations of parts, whereby it shall be capable of a variety of uses, such, for example, as a cultivator for cotton, tobacco, corn, and other vegetables and plants, for listing land and opening the row, simultaneously, for covering corn and other grain, and similar purposes.

It is a further purpose of our invention to provide a plow that shall be capable of use either upon a hill-side, or upon level ground, and by which the soil may be turned in either direction the construction of said plow being simple and the parts strong and durable and capable of easy and quick adjustment to meet the requirements of various kinds of work.

The invention consists in the novel parts and combinations of parts hereinafter fully explained and then more particularly pointed out and defined in the claims which form part of this specification.

To enable others skilled in the art to which our invention pertains to fully understand and to make, construct, and use the same, we will proceed to describe said invention in detail, reference being had, for this purpose, to the accompanying drawings, in which—

Figure 1, is a perspective view of a plow constructed in accordance with our invention. Fig. 2, is a plan view of the same. Fig. 3, is a detail plan view showing the forward portion of the plow-beam and its connections, the locking-bar being removed. Fig. 4, is a transverse section of the forward portion of the plow-beam, showing the sliding heads to which the plow-bars are hinged. Fig. 5, is a vertical, longitudinal section, taken in the line of the central beam of the plow, showing the construction and operation of the locking-bar and the adjustable, or sliding heads.
In the said drawings the reference-numeral 1 indicates the main, or central beam of the plow, to which are attached in any suitable manner the handles 2, which are usually lapped upon and bolted to the outer faces of said beam and further strengthened and supported by braces 3, to the upper ends of which the handles have, preferably, an adjustable attachment, whereby the height of their extremities may have a limited adjustment.

At a short distance in front of the point of attachment of the handles 2, the central beam 1 of the plow is cut away downward, leaving a comparatively thin, but strong and rigid bar 4, which extends some distance forward and terminates, at its extremity, in a short portion 5 having a thickness equal to that of the main portion 1, or nearly so. Upon each side of the latter, at a point just in front of the lower ends of the plow-handles, are formed, or mounted, lateral jaws, or mortise-blocks 6, in which are fitted the ends of guide-rails 7, which are raised slightly above and separated laterally from, the bar 4, the forward extremities of said guide-rails being fitted within jaws, or mortise-blocks 8, projecting laterally from the portion 5 of the bar 4. Upon each of the guide-rails 7 is mounted a sliding head 9, having an opening in which the guide-rail fits. Each of said sliding heads projects over the upper half of the bar 4 and also has bearing against its side face, an angular seat being provided in each head for this purpose. Upon the outer end of each sliding head 9 is formed a knuckle 10, which lies between two knuckles 12 which form part of a plow-carrying bar 13. Each of these bars extends rearward in substantially the same plane as the main plow-beam 1, until it meets and unites with two parallel transverse braces 14, which are pivotally connected to the upper and lower edges of the bar. These brace-bars are arranged a little in rear of the plow-handles and cross the central plow-beam 1 above and below the same and connected therewith by a pivot-bolt, or pin 15. Each pair of these brace-bars, comprising an upper and a lower member, extends across the central plow-beam and somewhat beyond the same, overlapping, to this extent, upon the similar brace-bars connected to the plow-bar upon the other side of the central beam. The overlapping portions are connected together, upon both sides of the pivot-bolt 15, by bolts 16, thereby forming, practically, a continuous, rigid pair of brace-bars, extending from one lateral plow-bar 13 to the other. As both members of each pair are provided with a series of apertures 17, for receiving the bolts 16 and the pivot-bolt 15, any required adjustment may be made to cause one, or both plow-bars to approach, or recede from, the central plow-beam 1, to any required degree.

In rear of the point of attachment of the brace-bars 14 to the plow-bars 13, the latter are curved rearward and downward in, or substantially in the arc of a circle, and to their lower extremities are attached, in any suitable manner, shovels 18, which are mounted upon the lower ends of said plow-carrying bars by means of bolts 19, whereby the plows are rendered detachable and interchangeable.

Upon the forward portion 5 of the bar 4, which carries the clevis 20, is hinged, or pivotally mounted, a locking-bar 21, having ears, or lugs 22 which straddle the portion 5 and receive a pivot-bolt 23, which passes through the lugs and through said portion 5 of the bar 4. This locking-bar 21 overhangs the bar 4, and is substantially co-extensive with it. It is provided with two shoulders 24 and 25, one at a little distance from the forward end of said locking-bar, and the other near the rearward end of the same. The width of the locking-bar is such that it will pass readily between the two parallel guide-rails 7, and its thickness, between its two shoulders 24 and 25 is such that, when thrown downward to its limit of movement, it will closely approach the bar 4. In the solid portion of the locking-bar, which lies between the two shoulders 24 and 25, is inserted a removable key-block 26, of such size and shape that the space filled by it will receive either one, or both, of the sliding heads 7. The locking-bar 21 is raised and lowered by a lever 27, which has a fulcrum 28 extending between the plow-handles, at a little distance above the point of their attachment to the central plow-beam 1. Said lever extends in rear of the fulcrum and is preferably bent, or curved, upward and provided at its rear end with a handle or cross-head 29. It is normally thrown downward, to depress the locking-bar, by means of a spring 30, which is coiled upon the fulcrum 28 and attached at its ends to the plow-handles, its middle portion being extended forward and looped over the top of the lever 27.

The central plow-beam 1 terminates in rear of the point of attachment of the pivot-bolt 15, and upon its end is mounted a laterally projecting plate 31, to which is detachably secured, by means of bolts 32 a curved plow-bar 33, which is curved rearward and then downward, and carries upon its lower end a detachable and inter-changeable shovel 34. This shovel, like those upon the other plow-bars 13, may be removed and replaced by others of different form. By raising the locking-bar 21 and sliding one of the heads 9 forward, and the other rearward, until they engage, respectively, with the shoulders 24 and 25 on the locking-bar one of the plows, or shovels carried by the plow-bars 13, will be advanced, and the other correspondingly drawn to the rear of the pivot-bolt 15, their relative distance from the central plow-beam being regulated by the variable attachment of the lateral plow-bars 13 to the transverse braces 14. In like manner, by raising the locking-bar and bringing the two sliding heads 9 into adjustable-position, or substantially so, and removing the key-block 26, both heads may be caused to engage the space filled in the solid portion of the locking-bar by the said key-block, thereby locking the plows carried by the lateral plow-bars 13 in direct opposition, or substantially so.

What we claim is—

1. In a plow, the combination with a central beam, of two laterally separated guide-rails, sliding heads movable upon the guide-rails, plow-bars pivotally connected at their ends to the sliding-heads, a brace pivoted to the central beam and to the plow-bars, and a locking block for engaging the said sliding-heads to rigidly hold them at different points on the guide-rails, substantially as described.

2. In a plow, the combination with a central beam, of two laterally separated guide-rails, sliding-heads movable upon the rails, plow-bars pivotally connected at their ends to the sliding-heads, a brace pivoted to the central beam and to the plow-bars, a locking-block mounted on the central beam and movable into engagement with the said sliding-heads to rigidly hold them at different points on the guide-rails, and a pivoted lever jointed to the locking-block for operating the same, substantially as described.

3. In a plow, the combination with a central beam, of two laterally separated guide-rails, heads movable upon the rails, plow-bars pivotally connected at their ends to the sliding-heads, a brace pivoted to the central beam and to the plow-bars, a locking-block pivoted to the central beam and movable into engagement with the sliding-heads to rigidly hold them at different points on the guide-rails, and a pivoted, spring-pressed lever jointed to the locking-block for operating the same, substantially as described.

4. In a plow, the combination with a central plow-beam of lateral guide-rails, sliding heads movable upon said guide-rails and having support against the upper and lateral faces of the central plow-beam, plow-bars hinged or pivoted at their forward ends to the sliding-heads and at or near their rearward ends to transverse brace-bars pivoted upon the central plow-beam, and a locking-block pivoted to the central plow-beam for engaging the sliding heads to hold them in various positions upon the said guide-rails, substantially as described.

5. In a plow, the combination with a central plow-beam of lateral and parallel guide-rails having their ends supported upon the plow-beam, sliding heads movable upon said guide-rails and bearing upon the upper and lateral faces of the central plow-beam, plow-bars hinged or pivoted at their forward ends to the sliding heads and pivoted at or near their rearward ends to transverse brace-bars pivoted upon the central plow-beam, a locking-bar pivoted at one end to the plow-beam, and recessed to engage and hold the sliding-heads in different positions, and means for operating said locking-bar, substantially as described.

6. In a plow, the combination with a central plow-beam of lateral and parallel guide-rails, sliding heads movable thereon and having bearing upon the upper and lateral faces of the central plow-beam, lateral plow-bars hinged or pivoted at their forward ends to said sliding heads and at or near their rearward ends to transverse braces pivoted upon the central plow-beam, a locking-bar pivoted at one end upon the plow-beam and having shoulders adapted to engage the sliding heads, and a lever fulcrumed between the plow-handles and pivotally connected at its forward end to the locking-bar, substantially as described.

7. In a plow, the combination with a central plow-beam having lateral guide-rails supported at their ends in jawed blocks mounted on the central plow-beam, of sliding heads movable upon said guide-rails, lateral plow-bars hinged or pivoted at their forward ends to said sliding heads and to rearward transverse braces pivoted upon the central plow-beam, a locking-bar pivoted by one end to the plow-beam in front of the guide-rails and having shoulders to engage the sliding heads in different positions and provided with a removable key-block seated in a recess adapted to engage said sliding heads when the latter are brought opposite each other, and means for raising and lowering said locking-bar, substantially as described.

In testimony whereof we have hereunto set our hands in presence of two subscribing witnesses.

JOHN THOMAS DRUMMOND.
JAMES ALEXANDER DRUMMOND.

Witnesses:
W. H. PIPER,
N. H. EADS.